Nov. 16, 1943.  L. L. JUDGE  2,334,268
FASTENER FOR EYELETED EDGES
Filed March 9, 1942
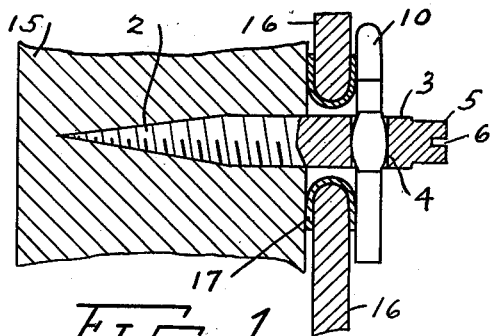
FIG. 1.
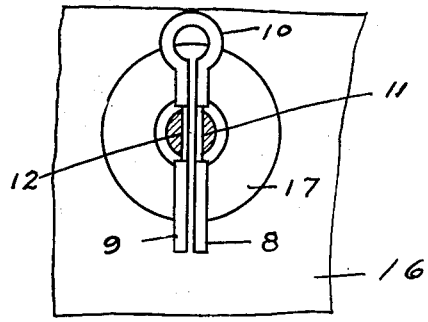
FIG. 2.
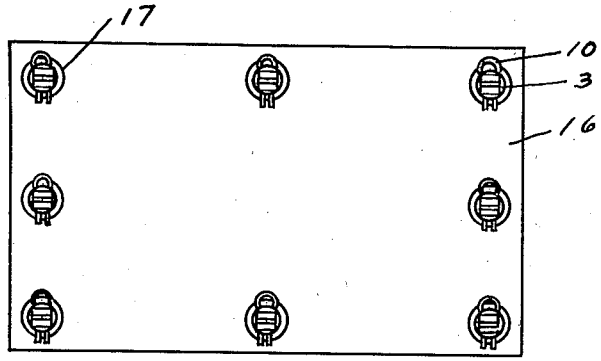
FIG. 9.
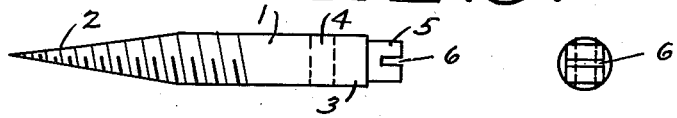
FIG. 3.   FIG. 4.
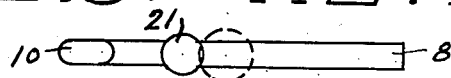
FIG. 7.
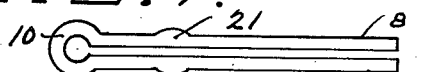
FIG. 8.
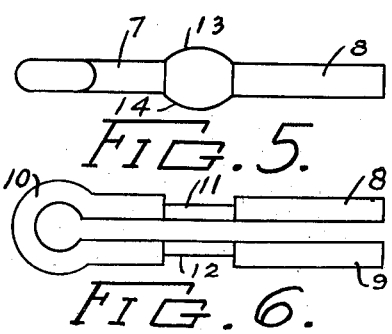
FIG. 5.
FIG. 6.
Inventor
LOUIS LEAHY JUDGE.
By Howard J. Whelan,
Attorney Patented Nov. 16, 1943

2,334,268

UNITED STATES PATENT OFFICE 2,334,268

FASTENER FOR EYELETED EDGES

Louis Leahy Judge, Baltimore, Md.

Application March 9, 1942, Serial No. 433,951

2 Claims. (Cl. 24—201)

This invention refers to attachments and more particularly to a unit comprising a screw and a locking pin for use in holding frames and material in place on a surface. The objects of this invention include the construction of a device that can be used for very quickly attaching frames or materials in place on a wall or surface; to have such device relatively simple and inexpensive; and to be self-locking. Another object is to have the unit adjustable, substantial and adaptable to meet the requirements of a large number of uses, where the same functions are applicable. A further object is to have the unit designed to be placeable without the use of extraneous tools. A still further object is to have the device arranged for assembly and use in holding objects without requiring the employment of tools, other than the hands of the operator.

Other objects will become apparent as the invention is more fully set forth.

The Patent No. 1,440,997 issued to the applicant outlines the original invention and indicates a screw combined with a locking pin for holding grommets attached to cloth, securely to a surface. This application describes and illustrates an improvement of the device. The improvement consists in swaging the locking pin near the middle, so it will form a lock on the screw or other body used when it is pushed in. This structure prevents the locking pin from creeping either way after it is put in place and allowing one end to slip through the grommet and thereby loosen the material from the device. In the original form, it was found after considerable use that a cotter pin would slip through the hole in the grommet after a while, and especially when the material was vibrated by the wind or otherwise. This was because the cotter pin depended on friction alone to keep it in place. The present arrangement overcomes this difficulty and substantially increases the utility of this type of fastener, without adding appreciably to the cost of manufacture or installation by providing a positive locking pin. The locking pin is readily manipulated for locking and unlocking, and does not make the device any more difficult to use. While in locked position, the locking pin may be used as a handle to permit the user to manually adjust the screw in the wall, wood or material that holds it.

In the drawing which illustrates an embodiment of this invention:

Figure 1 is a sectional side elevation of a fastener unit embodying this invention, located in a wall;

Figure 2 is a plan view of Figure 1;

Figure 3 is a detail of the stem member of the unit;

Figure 4 is an end view of Figure 3;

Figure 5 is a plan view of the locking pin used with the unit;

Figure 6 is a side view of Figure 5;

Figure 7 is a detail view of a modified form of locking pin;

Figure 8 is a side view of Figure 7, and

Figure 9 is an elevation of a black-out frame utilizing this invention.

Similar reference characters refer to similar parts throughout the drawing.

In the construction indicated in the drawing, 1 represents a stem having its lower portion preferably screw-threaded at 2, and its upper shank portion 3 drilled with a transverse and circular hole 4, while its head 5 is rectangular and slotted at 6 to receive either a socket wrench or screw-driver. Through the hole 4, is placed a locking pin 7 having a pair of legs 8 and 9 respectively formed with a joining eyelet headpiece 10 having the general form of a conventional cotter pin. The legs 8 and 9 are swaged at their middle portion to form a pair of grooves 11 and 12 and extending side portions 13 and 14. The side portions 13 and 14 serve to bind the sides of the hole and keep the locking pin steady while in it, while the grooves 11 and 12 engage the shank 3 as indicated and resiliently lock in place when the pin is located within it. The headpiece 10, gives the pin its resilient action. The legs are pressed together to release the locking pin from the shank when it is desired to pull it out.

When the unit is used, the stem is screwed or driven into the wood or material 15 that the frame or fabric 16 having the grommet 17, is to be secured to. This may be done by using the locking pin as a handle to twist it, or by using a wrench or tool on the rectangular head or slot 6. After the units are located and installed, the locking pins are removed. Then the frame or material 16 with its grommets 17 are installed on the stems 1. The locking pins are then inserted and pressed against the grommets to hold them and the frame in place. These locking pins are pushed through the holes in the stems until their grooved portions engage on the peripheral surface of the stem and lock themselves in place. The locking pins while in place over the grommets, press them so they are kept in place, and the grommets in turn hold the frame or fabric in place. The locking pins are removed readily by pressing their legs together to unlock the sides of the grooves and then withdrawing them out of the holes in the stems.

This allows the grommets to slide over the upper portions of the stems, and the frame to be removed. The action is very simple and quick and permits the user to install or remove the frame or material at any time, without much trouble and without the use of tools of any kind. The modified construction of the locking pin indicated in Figures 7 and 8 uses a swaged portion 21 that is larger than the passage in the stem and locks it on one side only to prevent it passing further to the opposite side of the stem.

While but two general forms of the inventions are shown in the drawing and described in the specification, it is not desired to limit this application for patent to these particular forms or in any other way otherwise than limited by the scope thereof, as it is appreciated that other forms could be made that would use the same principles and come within the scope of the appended claims.

Having thus described the invention, what is claimed is:

1. In combination with a fabric with an open grommet attached thereto, of a fastener comprising a stem having one end portion screw-threaded for attaching it to a body of solid material and of a cross-sectional area to permit its passage through the opening in the grommet, the other end portion of the stem having a hole of predetermined size and shape passing transversely therethrough spaced away from the end, the portion of the stem adjacent to the end being restricted to a smaller cross-sectional area than the holed portion and adapted to receive a tool for turning the stem for screwing same in and out of the said body, and a locking pin of cotter pin form having an enlarged ring headpiece at one end and resiliently joining two hinging legs of equal length and rectangular cross section and separated therefrom and adapted to fit into a hole in the stem when the legs are closed together against each other, the middle portion of the legs being thinned in width transversely and spread in the direction of its thickness to engage opposite sides of the hole, the thinned width of the legs providing grooves and sides that grasp and lock on opposite sides of the hole in the stem when the legs are allowed to spring open into normal position, the location of the opening and position of the locking pin in the grommet and fabric being such that the screwing of the stem into the body will force the pin to press across the face of the grommet and hold it firmly without the pin tending to disengage from the stem.

2. In combination with a fabric with an open grommet attached thereto, of a fastener comprising a stem having one end portion screw-threaded for attaching it to a body of solid material and of a cross-sectional area to permit its passage through the opening in the grommet, the other end portion of the stem having a hole of predetermined size and shape passing transversely therethrough spaced away from the end, the portion of the stem adjacent to the end being restricted to a smaller cross-sectional area than the holed portion and adapted to receive a tool for turning the stem for screwing same in and out of the said body, and a locking pin of cotter pin form having an enlarged ring headpiece at one end and resiliently joining two hinging legs of equal length and rectangular cross section and separated therefrom and adapted to fit into a hole in the stem when the legs are closed together against each other, the middle portion of the legs being thinned in width transversely and spread and rounded in the direction of its thickness to engage opposite sides of the hole, the thinned width of the legs providing grooves and sides that grasp and lock on opposite sides of the hole in the stem when the legs are allowed to spring open into normal position, the location of the opening and position of the locking pin in the grommet and fabric being such that the screwing of the stem into the body will force the pin to press across the face of the grommet and hold it firmly without the pin tending to disengage from the stem, the rounded portions of the pin permitting the same to adjust itself to the direction in which the grommet lies against the body, and not requiring the legs of the pin to be of different lengths or bent out of line to retain the same within the said stem.

LOUIS LEAHY JUDGE.